United States Patent
Kristen et al.

(10) Patent No.: US 6,644,450 B2
(45) Date of Patent: Nov. 11, 2003

(54) SAFETY CLUTCH FOR ELECTRICAL HAND-HELD TOOL

(75) Inventors: Ferdinand Kristen, Gilching (DE); Hans-Werner Bongers-Ambrosius, Munich (DE); Peter Hellmann, Obermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/017,624

(22) Filed: Nov. 30, 2001

(65) Prior Publication Data

US 2002/0066632 A1 Jun. 6, 2002

(30) Foreign Application Priority Data

Dec. 1, 2000 (DE) .......................................... 100 59 747

(51) Int. Cl.[7] ............................................. F16D 27/108
(52) U.S. Cl. ................... 192/17 C; 192/84.5; 192/84.6; 81/473
(58) Field of Search ............................ 192/17 C, 12 D, 192/84.5, 84.51, 84.94, 84.96; 81/473, 474, 475

(56) References Cited

U.S. PATENT DOCUMENTS

| | | | | |
|---|---|---|---|---|
| 2,620,136 A | * | 12/1952 | Levine | 192/12 D |
| 2,853,165 A | * | 9/1958 | Walter | 192/17 C |
| 3,199,645 A | * | 8/1965 | Henning | 192/84.5 |
| 3,703,227 A | * | 11/1972 | Murakami et al. | 192/84.5 |
| 4,993,532 A | * | 2/1991 | Weiss et al. | 192/84.51 |
| 5,396,976 A | * | 3/1995 | Koitabashi | 192/84.5 |
| 5,575,371 A | * | 11/1996 | Gonda et al. | 192/84.51 |
| 5,879,111 A | * | 3/1999 | Stock et al. | 408/6 |
| 5,909,787 A | * | 6/1999 | Kubo | 192/84.5 |

* cited by examiner

Primary Examiner—Rodney H. Bonck
Assistant Examiner—Eric M. Williams
(74) Attorney, Agent, or Firm—Sidley Austin Brown & Wood, LLP

(57) ABSTRACT

A safety clutch for an electric hand-held tool and including a rotor (8), an anchor disc (9) frictionally engageable with the rotor (8) for transmitting a torque there-between, a stationary axial stop (13) for limiting the air gap (s) between the rotor and the anchor disc and engageable by the anchor disc under an axial reserved pre-stress applied to the anchor disc (g); and a stationary electromagnetic coil (11) provided on a side of the rotor (8) remote from the anchor disc (9) and coaxial with the rotor (8) for generating a rotationally symmetrical magnetic flux ($\phi$) for attracting of the anchor disc (g) to magnetic poles (12a, 12b) associated with the rotor (8).

14 Claims, 2 Drawing Sheets

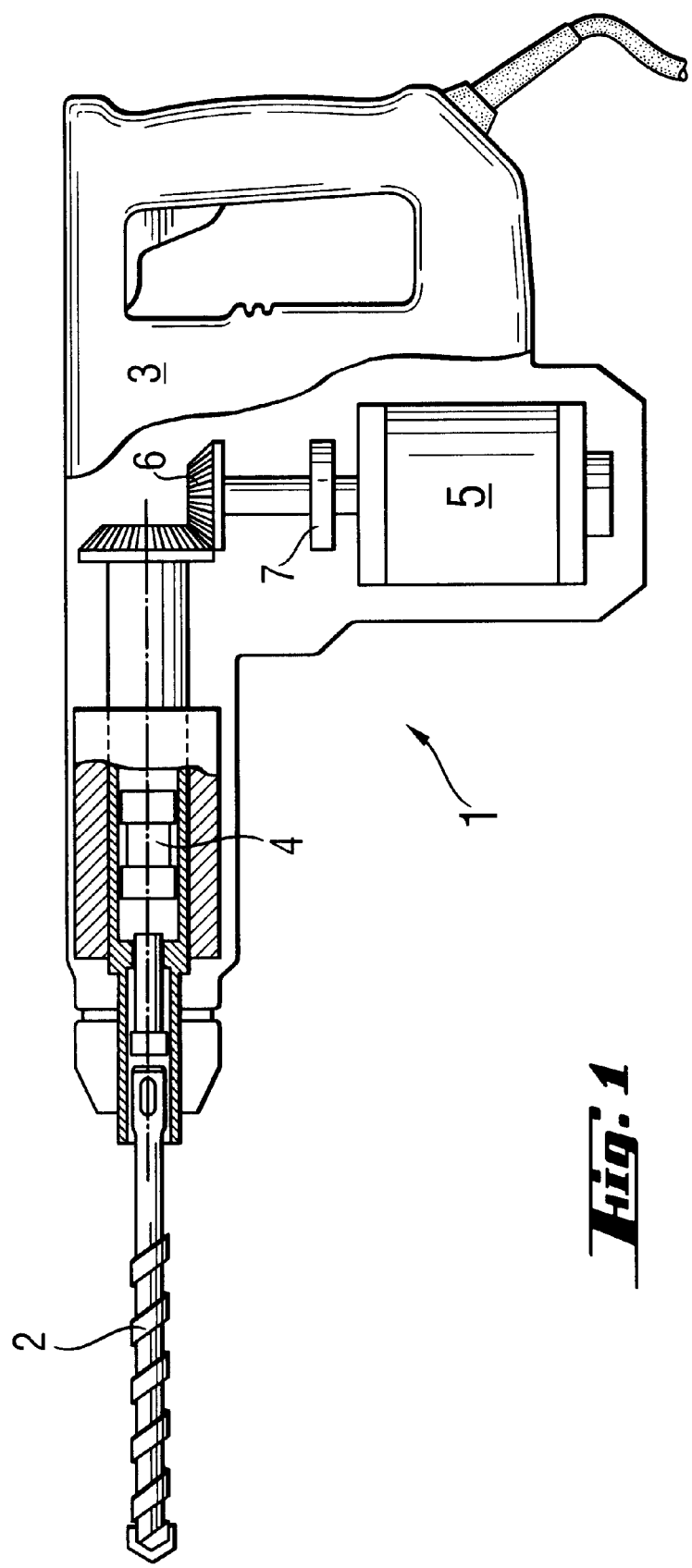

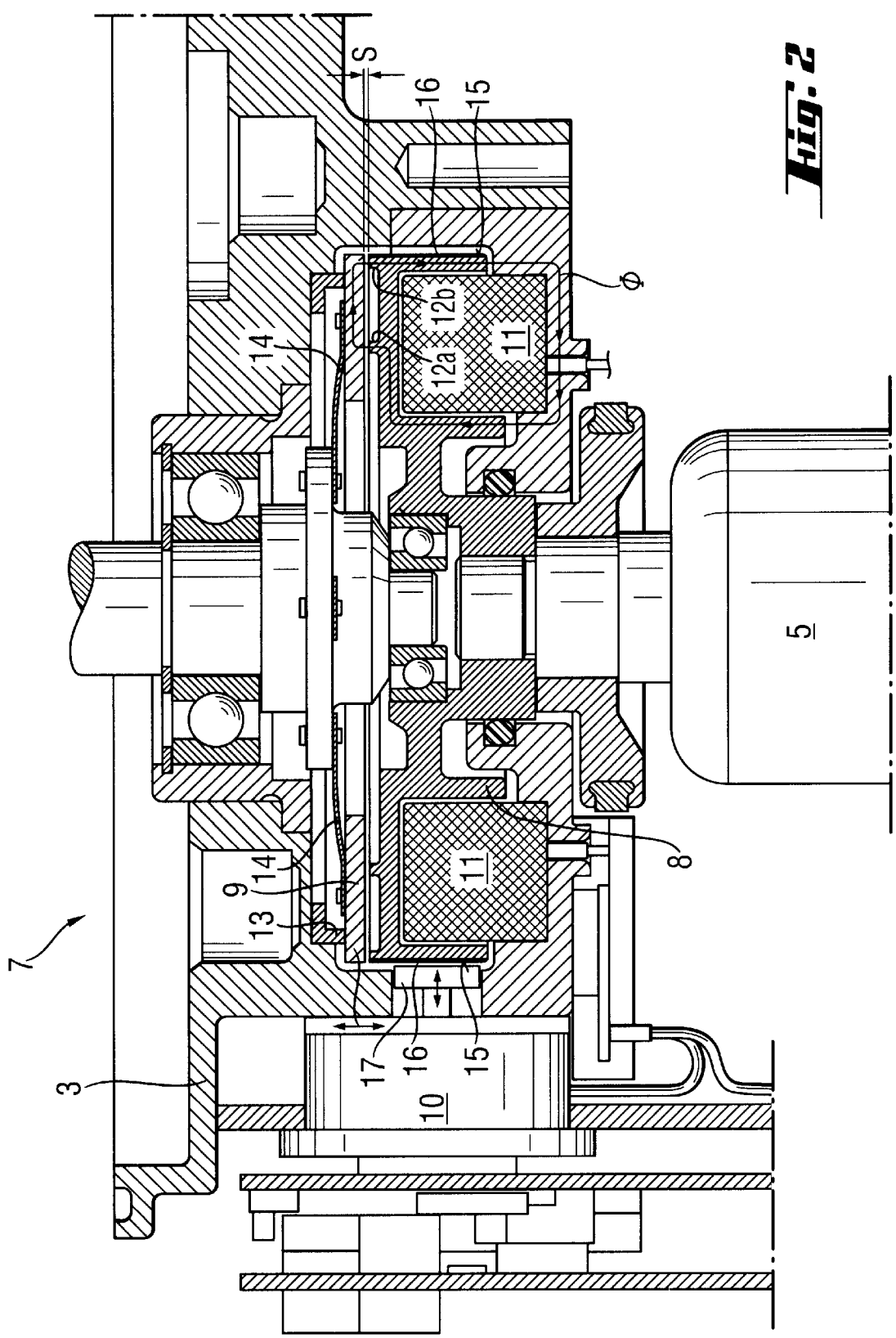

SAFETY CLUTCH FOR ELECTRICAL HAND-HELD TOOL

BACKGROUND OF THE INVENTION

1. Field of the Invention

The present invention relates to a safety clutch for an electrical hand-held tool with a rotatable working tool and which separates, under critical operational conditions, the rotational energy-supplying electric motor from the remainder of the power or torque transmission chain. In particular, the present invention relates to a safety clutch for a hammer drill.

2. Description of the Prior Art

Electrical hand-held tools, such as hammer drills, are usually driven by a rapidly rotatable electric motor that, as a result, stores a lot of the rotational energy due to its large mass moment of inertia. In order to protect the electrical tool user under critical conditions, in particular in case of hooking of the working tool, from an unpermissible deflection of the electrical hand-held tool, either the drive energy should be cut off sufficiently rapidly or the power transmission chain between the rotational energy storing, electric motor and the working tool should be sufficiently quickly broken. In large power electrical hand-held tools, the drive energy cannot be cut-off sufficiently rapidly without the use of additional means to that end.

For breaking a power transmitting chain, a clutch, which is formed as a safety clutch, is incorporated into the power transmitting chain. EP 666 148 discloses an electrically controlled electromagnetic clutch which breaks the power transmitting chain, in case of an accident, very rapidly. This clutch, under normal operational conditions, provides for force transmission as a result of static friction generated by an electrically controlled press-on force.

German Publication DE 21 10 609 discloses an electrically controlled magnetic clutch-brake combination including a driven side rotor and a driving side, axially resiliently prestressed anchor disc, and a stationary electromagnetic coil provided on a side of the rotor remote from the anchor disc and coaxial with the rotor for generating a rotationally symmetrical magnetic flux for attracting of the anchor disc to magnetic poles associated with the rotor to provide for a frictional engagement of the anchor disc with the rotor for frictionally transmitting a torque therebetween.

European Publication EP 893 616 discloses use of a functioning like a brake, friction disc of a magnetic clutch-brake combination and which is arranged in the drive chain.

European Publication EP-0 537 202 also discloses an electromagnetically actuated clutch-brake combination.

European Publication EP-0 947 721 discloses a clutch the engaging surface of which is hardened with a nitride.

German Publication DE 38 28 854 discloses a clutch-brake combination with radially displaceable, operating brake shoes.

An object of the present invention is to provide compact electromagnetic clutch capable of transmitting a large torque.

Another object of the present invention is to provide a safety clutch-brake combination with an electrically controlled, active braking of the rotor.

SUMMARY OF THE INVENTION

This and other objects of the present invention, which will become apparent hereinafter, are achieved by providing a safety clutch including a rotor, an anchor disc frictionally engageable with the rotor for transmitting a torque therebetween and spaced from the rotor by an air gap in a disengagement position of the anchor disc, stationary axial stop for limiting the air gap and engageable by the anchor disc under an axial reserved prestress applied to the anchor disc, and a stationary electromagnetic coil provided on a side of the rotor remote from the anchor disc and coaxial with the rotor for generating a rotationally symmetrical magnetic flux for attracting of the anchor disc to magnetic poles associated with the rotor to provide for a frictional engagement of the anchor disc with the rotor.

Providing, according to the present invention, an axial stop, which limits the gap between the anchor disc and the rotor in the disengagement condition of the anchor disc and which becomes engaged by the anchor disc under an axial reserved prestress, insures a sufficiently rapid backspringing of the anchor disc that insures a quick disengagement, a necessary characteristic of a safety clutch.

Advantageously, the stop, which is formed as an annular member, is made of a gliding material such as, e.g., red brass, with the anchor disc forming with the stop advantageously only a linear contact in the disengagement position of the anchor disc.

Advantageously, the axial reserved prestress is applied by an axially prestressed spring which is, preferably, formed as a leaf spring and is arranged within the ring shaped anchor disc. The spring applies a prestress in a range of 1–5 N. The spring has a mass of about 45 g and a stroke within 0.5 mm.

Advantageously, the gap has a width of about 0.3–0.5 mm. This gap insures a free rotation of the not exactly axially rotatable rotor and/or anchor rod and provides for a sufficient flux density that insures obtaining a necessary magnetic force for overcoming the reserved prestress.

Advantageously, the anchor disc and the rotor are formed rotationally symmetrically with respect to each other and are coaxial with each other, with two axially oriented pole shoes formed therebetween. Thereby, when they approach each other, the density of magnetic flux increases more rapidly than when only one axial pole shoe is provided. As a result, upon engagement, the transmitted torque, which is determined by the normal friction force, is greater than when one pole shoe is used.

Advantageously, the rotor is provided on the driving side of the power transmission chain, and the anchor disc is provided on the driven side of the power transmission chain. As a result, during disengagement, because of the small mass of the anchor disc, a small reserved rotational energy is required.

Advantageously, the rotor is formed as a cup member narrowly surrounding the electromagnetic coil from three sides, which permits to achieve a high magnetic flux density.

Advantageously, the rotor has a radial, cylindrical outer surface a normal to which oriented transverse to the rotational axis does not cause generation of an axial counterforce when the surface is subjected to a compression force.

Advantageously, the radial, cylindrical outer surface cooperates with an innerfriction surface of the radially displaceable, controllable brake element to provide for a controllable active braking of the rotor.

Advantageously, the radially outer surface of the rotor, which is formed of a soft magnetic material with a predetermined hardness, is hardened by a gas nitriding process, with the thickness of the nitride layer in a range from 0.003 mm to 0.01 mm. This permits to have more than 10,000 braking actions without the wear of the soft material of the rotor. Advantageously, a small increase of the diameter of the rotor, as a result of providing a nitride layer from 0.008 to 0.02, does not lead to any relevant increase of the rotor diameter, which insures a high accuracy of the rotor dimensions.

Advantageously, the brake element is formed as a small, electromagnetically controlled brake shoe or brake band. As a result, an active braking of the connected with the rotor, electric motor, which continues to rotate after disengagement, takes place in a hand-held tool within a narrow free space.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS:

The drawings show:

FIG. 1 a side, partially cross-sectional view of an electrical hand-held tool with a safety clutch according to the present invention; and FIG. 2 a cross-sectional view of a clutch-brake combination forming the safety clutch for the electrical hand-held tool.

DETAILED DESCRIPTION OF THE PREFERRED EMBODIMENTS

An electrical hand-held tool 1 according to the present invention, which is shown in FIG. 1, includes a housing 3 with a chuck for receiving a working tool 2, a percussion mechanism 4 located in the housing 3, an electric motor 5 and a drive gear 6, with both being located in the housing 3, and a safety clutch 7 arranged in a power flow from the electric motor 5 to the drive gear 6.

The safety clutch 7, a cross-sectional view of which is shown in FIG. 2, is formed, according to the invention, as a clutch-brake combination. The clutch-brake combination includes a rotatable rotor 8, an associated rotatable and axially displaceable, within a limited range, anchor disc 9, and a brake element 10 stationary secured in the housing 3. The anchor disc 9, which is provided on a rotor side and is coaxial with the rotor 8, is attracted or pulled to magnetic poles 12a, 12b, which are provided on the rotor 8, by a rotationally symmetrical magnetic flux φ which is generated by an electromagnetic coil 11 stationary secured in the housing 3. The anchor disc 9, being attracted to the rotor 8, provides for frictional torque transmission. In its disengaged condition, which is shown in FIG. 2, the anchor disc 9 forms with the rotor 8 a small gap S of 0.4 mm. The gap S is limited by an annular stop 13 stationary secured in the housing 3 and coaxial with the rotor 8 and the anchor disc 9. In its disengaged condition, the anchor disc 9 abuts the stop 13 under a reserved prestress, forming a linear contact therewith. On its bottom side, which is drivingly associated with the drive gear 6, the anchor disc 9 is provided with a leaf spring 14. The rotor 8, which is formed as a cup-shaped member, narrowly surrounds the electromagnetic coil 11 and has its drive side, remote from the anchor disc 9, associated with the electric motor 5. The rotor 9 has a radially outer cylindrical surface 15 which is covered with a nitride layer 16 having a thickness of 0.007 mm. The cylindrical surface 16 of the rotor 8 cooperates with a radially inner friction surface 17 of the brake element 10 that is formed as a radially displaceable brake shoe. The frictional engagement of the cylindrical surface 15 of the rotor 8 with the friction surface 17 is electromagnetically controlled.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A safety clutch for an electric hand-held tool, comprising a rotor (8); an anchor disc (9) frictionally engageable with the rotor (8) for transmitting a torque therebetween and spaced from the rotor (8) by an air gap (S) in a disengagement position of the anchor disc (9); a stationary axial stop (13) for limiting the air gap (S) and engageable by the anchor disc under an axial reserved prestress applied for the anchor disc, and fixedly securable in a tool housing (3); and a stationary electromagnetic coil (11) likewise fixedly securable in the tool housing (3) and provided on a side of the rotor (8) remote from the anchor disc (9) and coaxial with the rotor (8) for generating a rotationally symmetrical magnetic flux (φ) for attracting of the anchor disc (9) to magnetic poles (12a, 12b) associated with the rotor (8) to provide for a frictional engagement of the anchor disc (9) with the rotor (8).

2. A safety clutch according to claim 1, wherein the axial stop (13) is formed of a material having a gliding quality, and wherein the anchor disc (9) forms only a linear contact with the stop (13).

3. A safety clutch according to claim 1, wherein the axial stop (13) is formed as an annular member.

4. A safety clutch according to claim 1, further comprising an axially prestressed spring (14) for applying the reserved prestress to the anchor disc (9).

5. A safety clutch according to claim 4, wherein the spring (14) is axially prestressed for applying the reserved prestress of from 1 to 5 N.

6. A safety clutch according to claim 1, wherein the air gap (S) amounts from 0.3 to 0.5 mm.

7. A safety clutch according to claim 1, wherein the magnetic poles (12a, 12b) are formed as pole shoes extending between the anchor disc (9) and the rotor (8) and radially spaced from each other.

8. A safety clutch according to claim 7, wherein the rotor (8) is formed as a cup-shaped member narrowly surrounding the electromagnetic coil (11) from three sides.

9. A safety clutch according to claim 1, wherein the rotor (8) is provided on a driving side of a torque transmission means, and the anchor disc (9) is provided on a driven side of the torque transmission means.

10. A safety clutch according to claim 1, further comprising a controllable, radially displaceable brake element (10) with which the rotor (8) cooperates.

11. A safety clutch according to claim 10, wherein the brake element (10) is formed as one of small, electromagnetically controlled brake shoe and electromagnetically controlled braking band.

12. A safety clutch according to claim 10, wherein the brake element (10) has a friction surface (17) engageable with a radially outer surface (15) of the rotor (8).

13. A safety clutch according to claim 12, wherein the radially outer surface (15) of the rotor (8) is provided with a nitride layer (16).

14. An electric hand-held tool, comprising a housing (3); a percussion mechanism (4) located in the housing (3); an electric motor (5) for driving the percussion mechanism (4); gear means (6) for transmitting torque to the percussion mechanism (4); and a safety clutch (7) arranged in power flow from the electric motor (5) to the gear means (6), the safety clutch (7) having a rotor (8), an anchor disc (9) frictionally engageable with the rotor (9) for transmitting a torque therebetween and spaced from the rotor (8) by an air gap (S) in a disengagement position of the anchor disc (9), a stationary axial stop (13) for limiting the air gap (S), engageable by the anchor disc (9) under an axial reserved prestress applied to the anchor disc (9) and fixedly securable in the housing (3), and a stationary electromagnetic coil (11) likewise fixedly securable in the housing (3), and provided on a side of the rotor (8) remote from the anchor disc (9) and coaxial with the rotor (8) for generating a rotationally symmetrical magnetic flux ($\phi$) for attracting of the anchor disc (9) to magnetic poles (12a, 12b) associated with the rotor (8) to provide for a frictional engagement of the anchor disc (9) with the rotor (8).

* * * * *